United States Patent
Nagai et al.

[11] Patent Number: 5,820,642
[45] Date of Patent: Oct. 13, 1998

[54] PRESSURIZED AIR SUPPLY APPARATUS

[75] Inventors: Takaaki Nagai, Kobe; Masanori Imazu, Takasago, both of Japan

[73] Assignee: TOA Medical Electronics, Ltd., Hyogo, Japan

[21] Appl. No.: 882,113

[22] Filed: Jun. 25, 1997

Related U.S. Application Data

[63] Continuation of Ser. No. 465,097, Jun. 5, 1995, abandoned.

[30] Foreign Application Priority Data

Jun. 30, 1994 [JP] Japan .................... 6-149846

[51] Int. Cl.$^6$ .................................................. B01D 36/02
[52] U.S. Cl. ..................... 55/309.1; 55/310; 55/311; 55/DIG. 17
[58] Field of Search ................ 96/113; 55/309–311, 55/270, 410, 528, DIG. 17

[56] References Cited

U.S. PATENT DOCUMENTS

| | | | |
|---|---|---|---|
| 2,746,255 | 5/1956 | Fitch et al. | 55/DIG. 17 |
| 3,225,517 | 12/1965 | Wachsmuth | 55/DIG. 17 |
| 3,832,831 | 9/1974 | Ritchie et al. | 96/113 |
| 4,251,239 | 2/1981 | Clyde et al. | 55/528 X |
| 4,678,488 | 7/1987 | Howard et al. | 55/DIG. 17 |
| 4,714,483 | 12/1987 | Koening et al. | 96/113 |
| 4,717,396 | 1/1988 | Stengle et al. | 96/113 X |
| 4,840,838 | 6/1989 | Wyss | 55/528 X |

FOREIGN PATENT DOCUMENTS

| | | | |
|---|---|---|---|
| 6-134243 | 5/1994 | Japan | 55/DIG. 17 |
| 578997 | 11/1977 | U.S.S.R. | 96/113 |
| 927286 | 5/1982 | U.S.S.R. | 96/113 |
| 2277462 | 11/1994 | United Kingdom | 55/DIG. 17 |

*Primary Examiner*—Richard L. Chiesa

[57] ABSTRACT

A pressurized air supply apparatus includes an air intake section for sucking air from outside, a compressor which pressurizes and discharges the air sucked by the air intake section, a removing section for removing unnecessary components contained in the pressurized air discharged from the compressor, and a pressure adjusting section with a relief valve for discharging a part of the pressurized air free of unnecessary components for the removing section when the pressure of the pressurized air reaches a value higher than a predetermined value. An output section supplies the pressurized air pressure-adjusted by the pressure adjusting section to a load. An air recycling flow path mixes the pressurized air free of unnecessary components with air from outside. Thus, the apparatus receives the air free of the unnecessary components by air recycling to supply pressurized air of a high degree of cleanliness to the load and, at the same time, to eliminate the air discharge sound from the relief valve.

1 Claim, 4 Drawing Sheets

PRESSURIZED AIR SUPPLY APPARATUS

This application is a continuation of application Ser. No. 08/465,097 filed on Jun. 5, 1995, now abandoned.

BACKGROUND OF THE INVENTION

1. Field of the Invention

The present invention relates to a pressurized air supply apparatus for supplying pressurized air to various kinds of pneumatic drive sections and more particularly, to such type of pressurized air supply apparatus that is mounted and incorporated in medical electronic equipment such as a blood cell counting device, a clinical inspection device, etc.

2. Description of the Related Art

Recently, in medical electronic apparatuses for performing various examinations under control of a microcomputer, the driving of, e.g., a transport section, a measurement section and an analyzing section of a sample has been conducted by using various pneumatic driving sections (e.g., a cylinder, a valve and a pump) which are driven by a simple sequence control instead of using an expensive servomotor which needs a complicated electric control.

Accordingly, it has become necessary to provide a pressurized air supply apparatus for supplying pressurized air for driving a cylinder, a valve, a pump, etc. Further, this pressurized air is used to agitate and transport a liquid and to remove the clogging of apertures besides for driving the cylinder, valve and pump.

FIG. 4 is a block diagram of one example of a prior art pressurized air supply apparatus. In this figure, the pressurized air supply apparatus is provided with a compressor 41 for pressurizing air sucked through a filter $F_{41}$, a cooling section 42 for cooling the air pressurized by the compressor 41, a drain tank 43 for accumulating water contained in the cooled pressurized air, a dehumidifier 44 for further dehumidifying the cooled pressurized air, a pressure adjusting section 45 comprising a relief valve 45a for discharging the pressurized air from a pressurized air flow path when the pressure of the pressurized air reaches a predetermined value and an output section 46 for supplying to a drive section the pressurized air adjusted (to a value of $P_1 Kgf/cm^2$) by the relief valve 45a.

The pressure adjusting section 45 is further provided with a regulator 45b for adjusting the pressure of pressurized air (to value of $P_2 Kgf/cm^2$) according to its use so that the adjusted pressurized air is output from an auxiliary output section 46a.

For the compressor 41, includes a piston pump which serves as a compressor/vacuum. In FIG. 4, reference letter $F_{42}$ designates a vacuum side filter, reference numeral 47 designates a vacuum side pressure adjusting section and reference numerals 48 and 48a designate output sections for vacuum side airs which have been set to values of $V_{1mm}H_g$ and $V_{2mm}H_g$. Note that the description of the vacuum side pressure adjusting section 47 is omitted.

Conventionally, the pressurized air supply apparatus for medical electronic equipment used in hospitals makes use of its pressurized air for driving pneumatic driving sections (such as a cylinder, a valve, a pump, etc.) but since these sections, especially the cylinder and the valve (electromagnetic valve), must be free from moisture and dust, it is necessary to eliminate moisture and dust. Further, the pressurized air is used for agitating or transporting a liquid or for eliminating the clogging of apertures so that a pressurized air supply apparatus which is capable of supplying clean pressurized air (free of moisture and dust) and which has its driving sound controlled to a low noise level has been demanded.

For example, if clean pressurized air is used for a blood cell counting device, clinical inspection device and the like, since the pressurized air is free of moisture and dust, the sample inspecting environments (e.g., a transport section, a measurement section and an analyzing section) are improved and the rate of failure of the pneumatic driving section is reduced thereby eliminating the necessity of maintenance of the section.

However, as shown in FIG. 4, the conventional pressurized air supply apparatus has been of the structure that when the pressure of air in the air flow path reaches a predetermined value, the air is discharged outside the relief valve so that the clean air purposely removed of unnecessary components and moisture has to be wasted in vain. Further, where air sucked from outside contains much moisture, the air has not been dehumidified or cleaned sufficiently with only the filter $F_{41}$, the cooling section 42 and the drain tank 43.

Accordingly, it has been necessary to equip the apparatus with the dehumidifier 44. In addition, it has been usual that an air discharge sound generates when the air is discharged outside from the relief valve 45a.

SUMMARY OF THE INVENTION

The present invention provides a pressurized air supply apparatus which is simple in structure and which is capable of supplying high-purity pressurized air free of moisture and dust and which is capable of eliminating air discharging sounds from the relief valve wherein when the pressure of air supplied from a compressor is adjusted by a relief valve. The apparatus of the present invention uses an air recycling flow path so that the pressurized air discharged from the relief valve is returned from the compressor through the air recycling flow path to thereby reduce the quantity of further air to be sucked by the compressor from outside.

The pressurized air supply apparatus of the present invention includes an air intake section for sucking air from outside, a compressor for pressurizing and discharging the air sucked by the air intake section, and a removing section for removing unnecessary components in the pressurized air from the compressor. A pressure adjusting section having a relief valve releasing a part of the pressurized air when the pressure of the pressurized air removed of the unnecessary components by the removing section reaches a value higher than a preset value. An output section supplies the pressurized air pressure-adjusted by the pressure adjusting section to a load. An air recycling flow path operates such that the air discharged from the relief valve of the pressure adjusting section and removed of the unnecessary components is returned to the air intake section and mixed with sucked air from outside and the mixture is resucked into the compressor.

According to the present invention, by returning directly to the compressor pressurized air free of unnecessary components and discharged from the relief valve, it is possible to reduce the quantity of air containing much moisture and dust and sucked afresh into the compressor from outside and to increase the rate of removing moisture and dust in the air at the cooling section, the drain tank and the filter so as to supply pressurized air and it is also possible to eliminate air discharge sound from the relief valve.

BRIEF DESCRIPTION OF THE DRAWINGS

The present invention will be described in detail in conjunction with the accompanying drawings in which.

DESCRIPTION OF THE PREFERRED EMBODIMENTS

Figure 1:
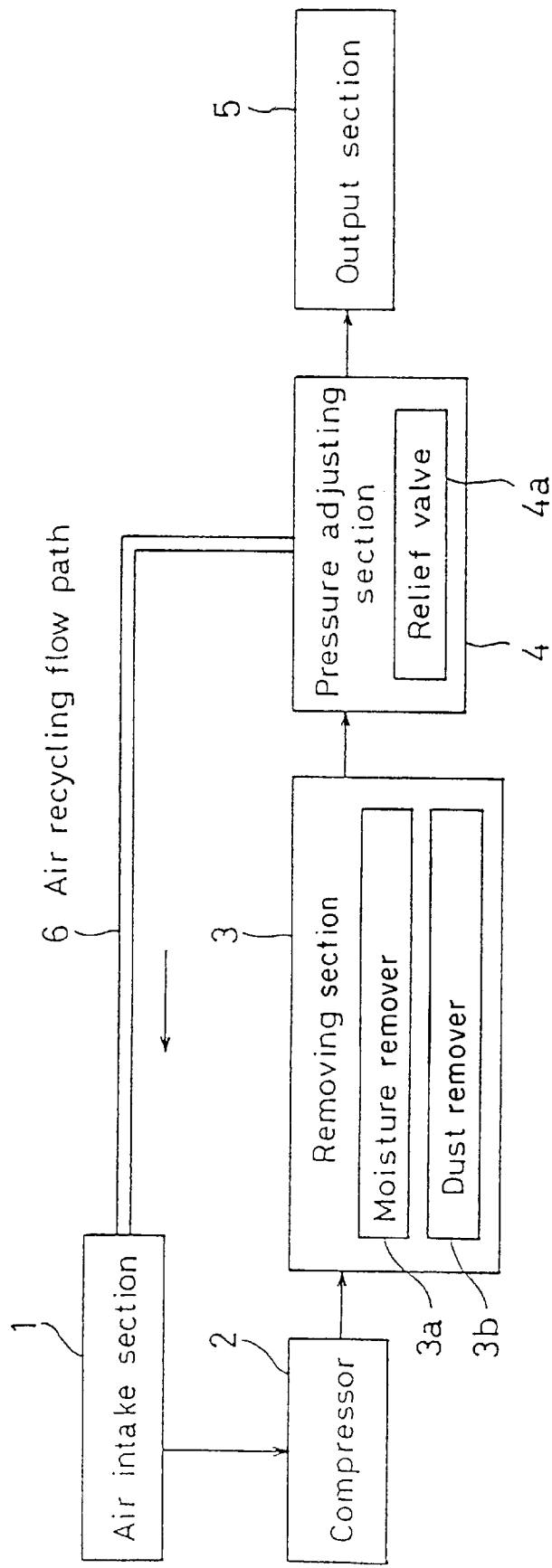
FIG. 1 is a block diagram showing a basic structure of a pressurized air supply apparatus according to the present invention.

The present invention will now be described on the basis of the embodiments shown in the drawings. It should be noted, however, that the invention is not limited to these embodiments. The pressurized air supply apparatus of the present invention is suitable for use with medical electronic equipment such as a blood cell counting device, a clinical inspection device and the like. Besides achieving the functions of increasing the degree of cleanliness of pressurized air by the recycling of air and eliminating the air discharge sound from a relief valve, the apparatus according to the present invention can improve the dehumidifying function. Thus, the apparatus of the present invention can dispense with the provision of a dehumidifier such as a dryer.

FIG. 1 is a block diagram showing the basic structure of the present invention. In FIG. 1, an air intake section 1 sucks air from outside, a compressor 2 pressurizes and discharges air sucked into the air intake section 1, and an unnecessary component removing section 3 removes unnecessary components contained in the pressurized air discharged from the compressor 2. A pressure adjusting section 4 has a relief valve 4a for leaking a part of the pressurized air when the pressure of the pressurized air removed of unnecessary components by the unnecessary component removing section 3 reaches a value higher than a preset value. An output section 5 supplies to a load the pressurized air adjusted by the pressure adjusting section 4. A recycling air flow path 6 allows the pressurized air removed of the unnecessary components and leaked from the relief valve 4a to be returned to the air intake section 1, to be mixed with air sucked from outside and to be resucked into the compressor 2. The apparatus of the present invention is formed of the above-mentioned elements 1 through 6.

That is, the recycling air flow path 6 is provided for the purpose of returning the pressurized air discharged from the relief valve 4a of the pressure adjusting section 4 to the air intake section 1 so that the pressurized air free of unnecessary components is resucked into the air intake section 1.

In the above case, the term "load" is a target which is driven by pressurized air from the pressurized air supply apparatus of the present invention. Further, the term "unnecessary components" means moisture and dust contained in the pressurized air.

Further, since the driving section of the apparatus mostly comprises parts which should be protected against moisture, it is preferable that the above-mentioned unnecessary component removing section 3 includes a dehumidifier moisture remover 3a.

In addition, it is preferable that the unnecessary component removing section 3 be formed of the dehumidifier means 3a and a dust remover 3b.

Further, the dehumidifier 3a is formed of, for example, a cooling section and a drain tank for removing due drops resulting from the cooling by the cooling section.

It is also preferable that the dust remover 3b be formed of, for example, a main filter provided between the cooling section and a relief valve. Particularly, it is preferable to use a drain tank incorporating a main filter.

The above-mentioned air intake section 1 is preferably provided with an auxiliary filter. It is also preferable that the air recycling path extend from the relief valve to join a portion between the auxiliary filter and the compressor 2 (i.e., at the intake port thereof).

Further, in order to supply pressurized air to a driving section provided in an analyzing mechanism, the pressurized air supply apparatus of the present invention is applied to an analyzing device as a component part of the latter.

In the present invention, a rocking piston type oilless pump capable of being driven by a commercial power supply of AC100V - 50/60 Hz is used to serve as a compressor 2.

For the cooling section of the unnecessary component removing means 3, there are used a fan and a radiating pipe (for example, a coil tube).

For the pressure adjusting section 4, it is usual to use a relief valve, a bellows pressure governor, a regulator or the like is used but in this case, the relief valve is used as a pressure adjuster for adjusting the pressurized air output from the output section 5.

Further, the relief valve 4a of the pressure adjusting section 4 returns the pressurized air to the air intake section 1 through the air recycling flow path 6 when the pressure of the air in the path 6 reaches a value higher than a preset value.

For the air recycling flow path 6, a tube made of nylon, urethane rubber or the like is used. Further, for the drive section to be connected to the output section 5, a cylinder, a valve (electromagnetic valve), a pump or the like is used.

With the above structure, it is possible to reduce the quantity of moisture and dust containing air to be sucked into the compressor 2 from outside afresh, to satisfactorily remove the moisture and dust in the air by the unnecessary component removing section and to supply pressurized air of a high-degree of cleanliness from the output section 5 while eliminating the air discharge sound from the relief valve 4a.

Accordingly, the dehumidifying effect increases so that the cooling section of the unnecessary component removing means 3 can be miniaturized. Further, the volume of the drain tank can be reduced.

Further, the filter becomes rarely clogged. No humidifier is required to be provided. Moreover, since the quantity of air passing through the filter of the air intake section 1 becomes small, the frequency of replacement of the filter is reduced.

Further, in case where the drive section is driven by using pressurized air of a high degree of cleanliness, the rate of failure of the driving section becomes low so that the maintenance of the driving section becomes no more necessary.

Figure 2:
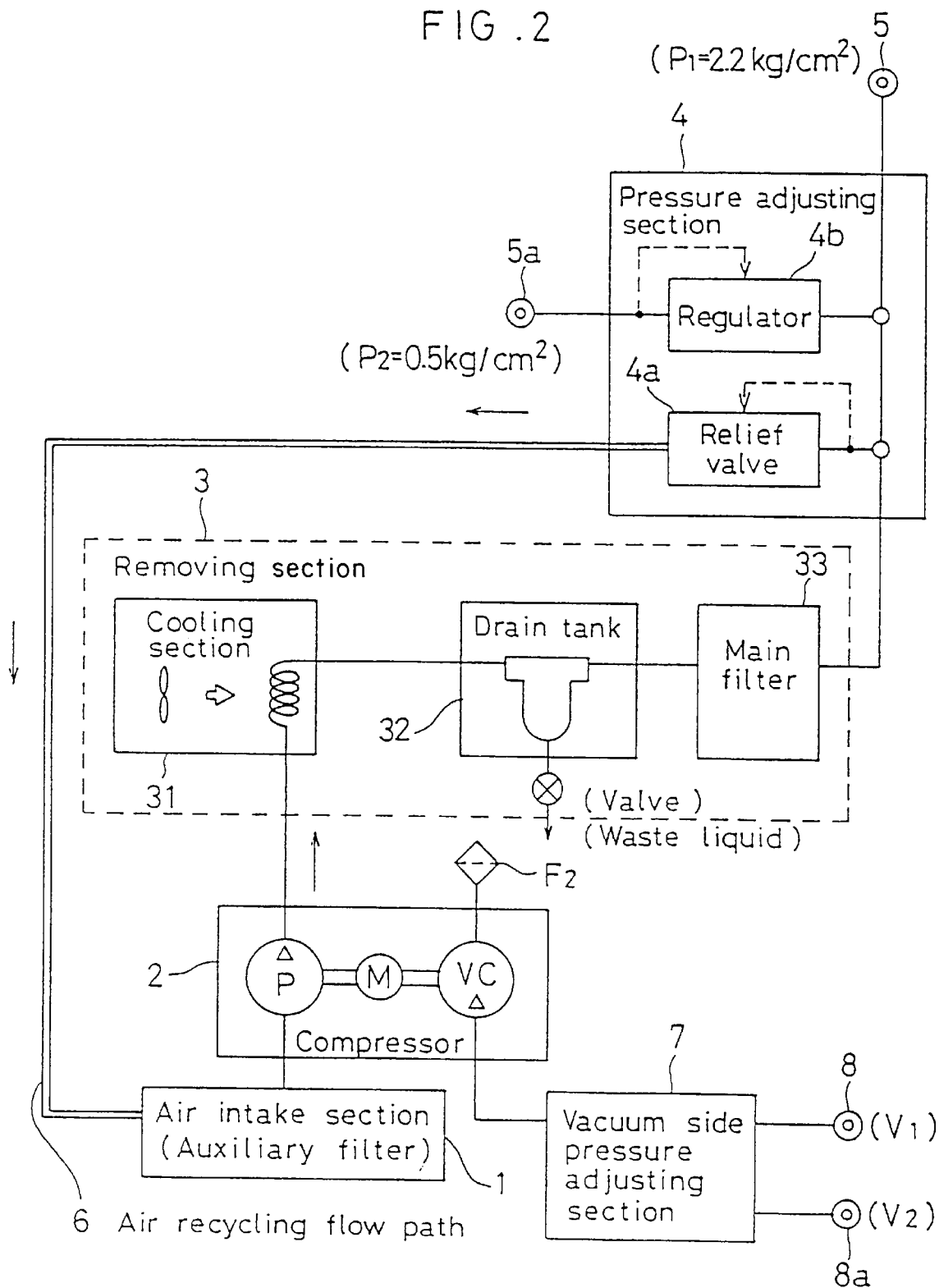
FIG. 2 is a block diagram of a pressurized air supply apparatus according to one embodiment of the present invention.

FIG. 2 is a block diagram of a pressurized air supply apparatus according to one embodiment of the present invention wherein like parts are designated by like reference numerals with respect to FIG. 1. An air intake section 1 sucks air through an auxiliary filter $F_1$ (for example felt, sponge) not shown. A compressor pressurizes air sucked into the air intake section 1 and discharges the pressurized air from a discharge port. Unnecessary component removing section 3 removes unnecessary components contained in the pressurized air discharged from the discharge port of the compressor 2. The unnecessary component removing section 3 includes a cooling section 31 for cooling the air pressurized by the compressor 2, a drain tank 32 for storing moisture contained in the cooled pressurized air and a main filter 33 (having, for example, a filtration rate of 5 μm). A drain tank attached with a filter may be used in place of the drain tank 32 and the main filter 33. (For example, The F.R.L.F150 available from the KOGANEI Co., Ltd.).

Further, for the cooling section 31, a fan and a coil tube and the like may be used.

A pressure adjusting section 4 includes a relief valve 4a which adjusts the pressure of the pressurized air by returning the air into the air intake section 1 through an air recycling flow path 6 (to be described later) when the pressurized air reaches a value higher than a predetermined value and a regulator 4b for adjusting the pressure of the pressurized air according to its use.

For the relief valve 4a, the 247L-1V available from the KURODA SEIKO Co., Ltd. may be used.

An output section 5 supplies the pressurized air adjusted by the pressure adjusting section 4 to the driving section.

Further, an auxiliary output section 5a outputs the pressurized air which has been pressure-adjusted ($P_2$Kgf/cm$^2$) by the regulator 4b provided according to its use.

A set value for the pressurized air output from the output section 5 is provided for the relief valve 4a of the pressure adjusting section 4.

The output section 5 and the auxiliary output section 5a are connected with various kinds of pneumatic driving sections such as a cylinder, a valve, a pump and etc.

The air recycling flow path 6 of the present invention through which path the pressurized air discharged from the relief valve 4a is returned to the air intake section 1.

By the provision of this air recycling flow path 6, the degree of cleanliness of the pressurized air output from the output section 5 and the auxiliary output section 5a is increased by reducing the quantity of air sucked from outside and the air discharging sound generated from the relief valve 4a is eliminated.

For the air recycling flow path 6, a tube made of nylon, urethane rubber or the like which is employed ordinary flow paths (pipings) is used.

For the compressor 2, a maintenance-free rocking piston type oilless pump (a piston pump which serves as a compressor/vacuum) capable of being driven by an AC100V - 50/60 Hz commercial power source.

For example, the rocking piston type oilless pump, the PSL-21 made by TOSHIBA AUTOMATION CORP., LTD. is used. An actual discharge flow rate of more than 4.5 NL/min was obtained at a frequency of 50/60 Hz and a discharge pressure of 2.2 kg/cm$^2$.

The set value for the pressure adjusting section 4, for example, at the relief valve 4a, is a Discharge Pressure $P_1$=2.2 Kg/cm$^2$. Further, this pressure P1 is further set by the regulator 4b according to its use to a Discharge Pressure $P_2$=0.5 kg/cm$^2$.

Reference symbol $F_2$ designates a vacuum side filter, reference numeral 7 designates a vacuum side pressure adjusting section and reference numerals 8 and 8a designate vacuum side output sections set to values of $V_{1mmHg}$ and $V_{2mmHg}$, respectively. The description of the vacuum side pressure adjusting section 7 is omitted.

Figure 3:
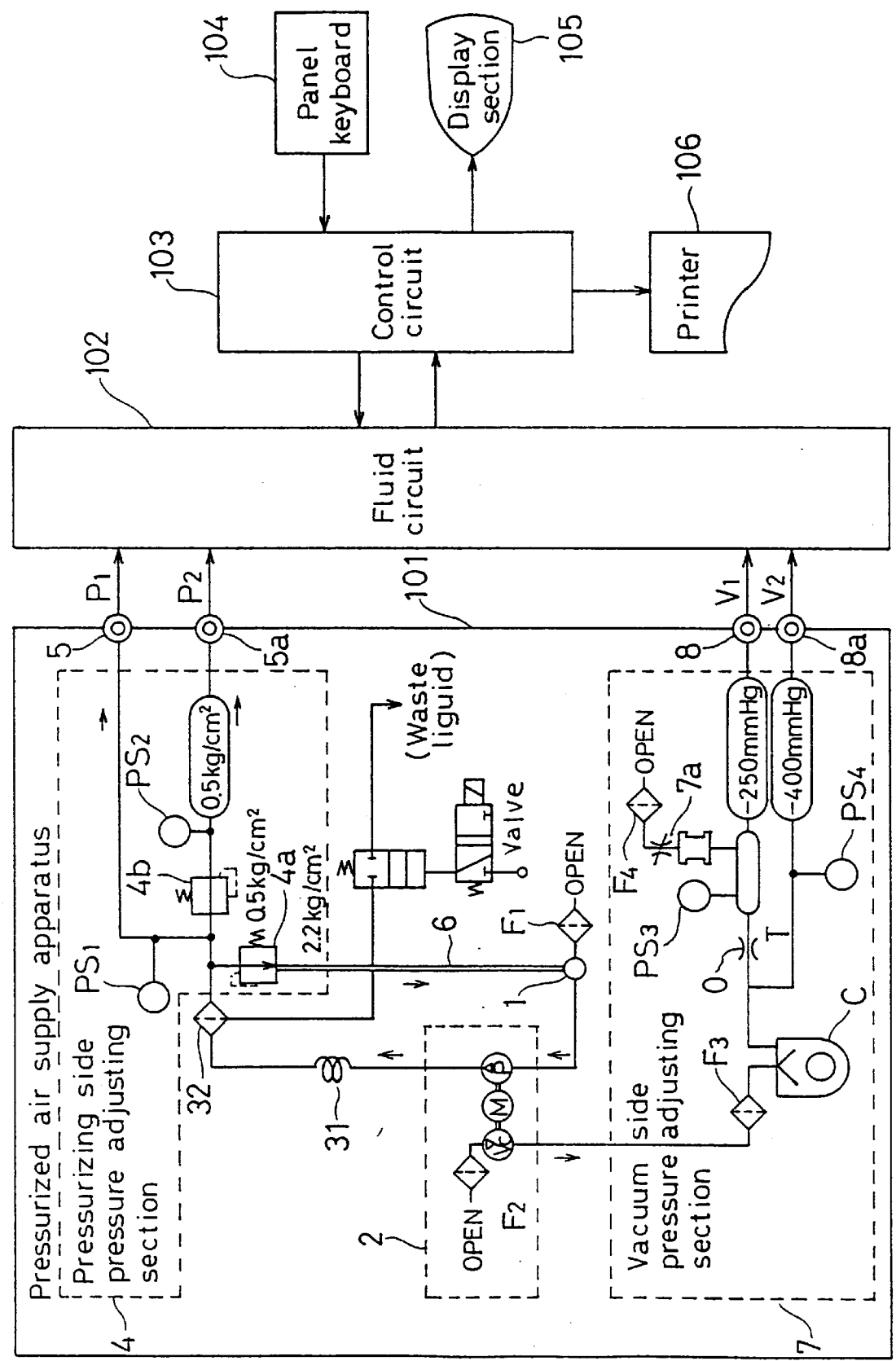
FIG. 3 is a block diagram of a pressurized air supply apparatus according to another embodiment of the present invention when the invention is applied to a blood cell counting apparatus.
Figure 4:
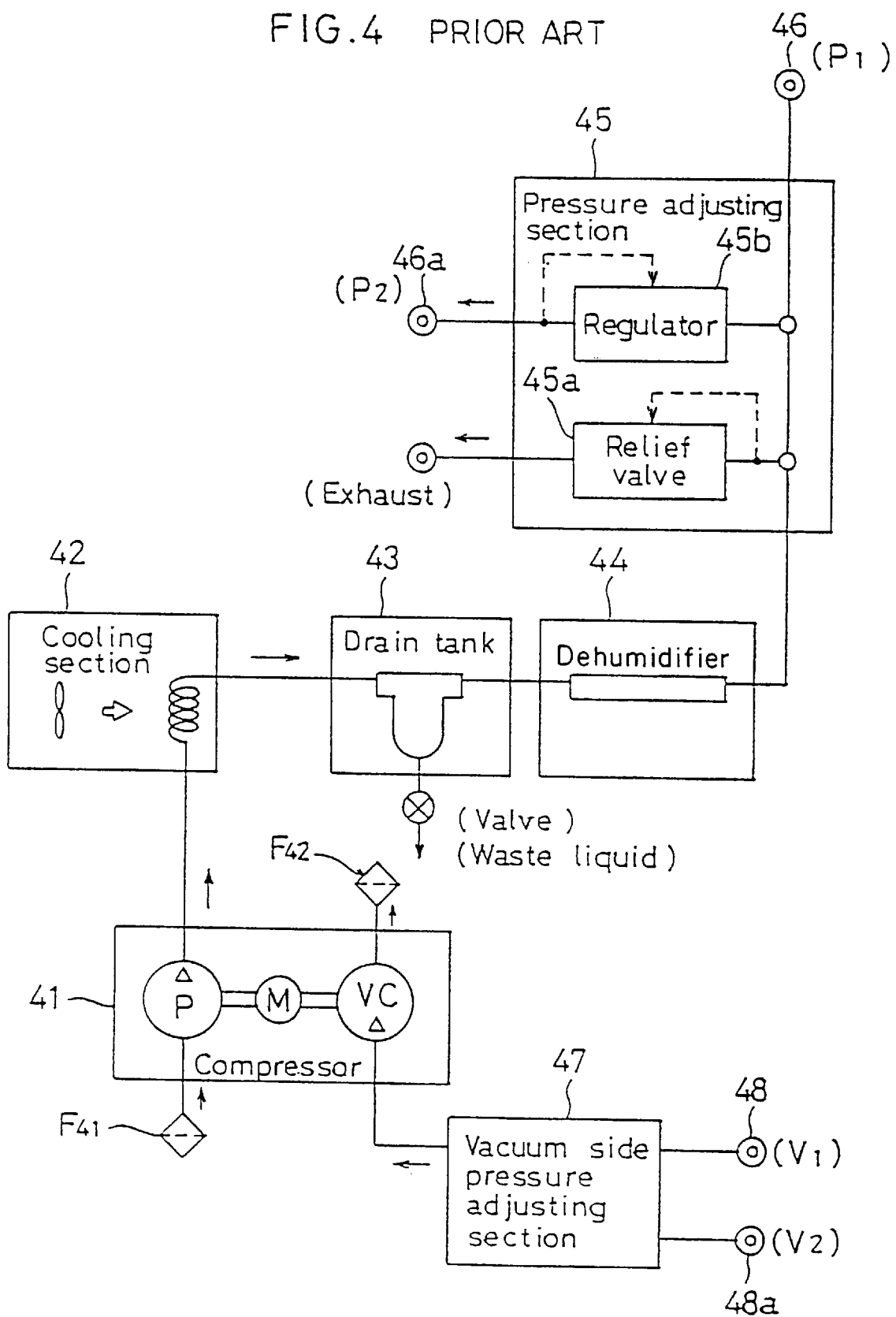
FIG. 4 is a block diagram of one example of a conventional pressurized air supply apparatus.

FIG. 3 is a block diagram of the apparatus according to one embodiment of the present invention especially when it is applied to a blood cell counting device. In FIG. 3, a pressurized air supply apparatus 101 includes a compressor 2, a cooling section 31, a drain tank 32 attached with a filter, a pressurizing side pressure adjusting section 4, an air recycling flow path 6, a vacuum side pressure adjusting section 7, pressurizing side output sections 5 and 5a, and vacuum side output sections 8 and 8a. The compressor 2 is formed of a piston type oilless pump and a filter $F_1$.

Further, the pressurizing side pressure adjusting section 4 comprises a relief valve 4a, a regulator 4b and pressure sensors $PS_1$ and $PS_2$.

The vacuum side pressure adjusting section 7 comprises a bellows pressure adjusting device 7a, an orifice O, a vacuum tank T, filters $F_2$–$F_4$, a reverse-flow preventing chamber C and pressure sensors $PS_3$ and $PS_4$.

The cooling section 31 is provided between the compressor 2 and the drain tank 6 attached with a filter so as to cool pressurized air.

The air recycling flow path 6 is provided between the air intake section 1 of the compressor 2 and the relief valve 4a.

A fluid circuit 2 is to be connected to the pressurized air supply apparatus 101 so that the aerial agitation and transport of a blood and the counting of the number of blood cells in the blood cell counting device are conducted by using various kinds of pneumatic driving means (such as a cylinder, valve, pump and the like).

A control circuit 103 for controls the fluid circuit 102 and the operations of counting, analyzing and data processing of blood cells. This control circuit 103 controls a microcomputer comprising a CPU, ROM, RAM, timer and I/O port.

The ROM of the microcomputer stores therein various kinds of programs and various kinds of constants with the programs including a control program for sequentially controlling various kinds of pneumatic driving devices provided in the fluid circuit 102, a blood cell counting program for counting the number of blood cells and an input control program for processing input data. Further, data of measured and analyzed bloods and other various kinds of data are also stored in the RAM.

The control circuit 103 is connected with a panel keyboard 104, a display section 105 and a printer 106.

The relief valve 4a of the pressurizing side pressure adjusting section 4 is, for example, set to a value of Discharge Pressure $P_1$=2.2 kg/cm$^2$. Further, the regulator 4b classified by use is set to a value of Discharge Pressure $P_2$=0.5 Kg/cm$^2$. The vacuum side pressure adjusting section 7 is set to values of Air Intake Pressure V1=−250 mmHg and V2=−400 mmHg.

Further, the discharge pressure and the air intake pressure are always monitored by the pressure sensors $PS_1$–$PS_4$.

The display section 105 displays pressure data, data of measured and analyzed bloods and other various kinds of data.

Accordingly, the fluid circuit 102 is supplied with clean pressurized air by the pressurized air supply apparatus 101 of the present invention. That is, the air discharged from the relief valve 4a is directly sucked by the compressor without being discharged outside so that the amount of moisture and dust contained in the pressurized air is reduced and the blood measuring environment is further improved to increase the measurement accuracy. Further, the rate of failure of the pneumatic driving means is reduced to avoid the necessity of maintenance and the air discharge sound due to the adjustment of pressurized air becomes low thereby obtain a quiet environment.

Incidentally, the moisture obtained by the drain tank 32 was 8.0 mg/sample which was less than one-third of the moisture content of 28.7 mg/sample of the conventional apparatus without no air recycling flow path 6.

What is claimed is:

1. A pressurized air supply apparatus, comprising:

an air intake section with an auxiliary filter for sucking air from outside said pressurized air supply apparatus;

a compressor for pressuring and then discharging air sucked by the air intake section;

removing means for removing moisture and dust contained in the pressurized air discharged from the compressor, said removing means including a cooling section, a drain tank, and a main filter;

a pressure adjusting section provided with a relief valve for maintaining a pressure of said pressurized air at a predetermined value, said relief valve exhausting a part of the pressurized air when the pressure of the pressurized air removed of moisture and dust by the removing means reaches a value higher than the predetermined value;

an output section for supplying to a load the pressurized air pressure-adjusted by the pressure adjusting section; and an air recycling flow path for returning to the air intake section the part of the pressurized air exhausted from the relief valve to maintain the pressure of the pressurized air at the predetermined value.

* * * * *